(12) United States Patent
Lavoie

(10) Patent No.: US 9,552,680 B2
(45) Date of Patent: Jan. 24, 2017

(54) TIRE ROTATION WARNING

(71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 14/629,898

(22) Filed: Feb. 24, 2015

(65) Prior Publication Data

US 2016/0247329 A1  Aug. 25, 2016

(51) Int. Cl.
*B60Q 1/00* (2006.01)
*G07C 5/00* (2006.01)
*B60C 11/00* (2006.01)

(52) U.S. Cl.
CPC .............. *G07C 5/006* (2013.01); *B60C 11/00* (2013.01)

(58) Field of Classification Search
CPC ............. B60C 23/0416; B60C 23/0472; F16K 31/385; F16K 1/221; F16K 31/124; F16K 31/128; F16K 31/365; F16K 7/17; G05D 7/03; G05D 7/018; G05D 1/0206; G05D 3/1436; G05D 7/0664; G01D 18/008; G01D 5/145; G01P 21/02; G01P 3/487
USPC .......................... 340/457.4, 444, 438, 425.5, 442–443, 340/445, 447, 670–671
See application file for complete search history.

(56) References Cited

U.S. PATENT DOCUMENTS

| | | | | |
|---|---|---|---|---|
| 5,847,645 A * | 12/1998 | Boesch | ................ | B60C 23/061 340/442 |
| 5,980,668 A | 11/1999 | Slingluff | | |
| 7,483,794 B2 * | 1/2009 | Bocquillon | ............. | B60C 11/24 701/36 |
| 7,762,129 B2 | 7/2010 | Niklas et al. | | |
| 8,584,721 B2 * | 11/2013 | Fujii | ....................... | B60C 11/24 152/154.2 |
| 2005/0082517 A1 * | 4/2005 | Steiner | ................ | B62D 43/045 254/323 |
| 2012/0235807 A1 * | 9/2012 | Rysenga | ............. | B60C 23/0472 340/445 |
| 2014/0194246 A1 * | 7/2014 | Ueda | ..................... | B60K 6/442 477/5 |
| 2015/0051802 A1 * | 2/2015 | Saitoh | .................... | F16H 61/16 701/60 |

* cited by examiner

*Primary Examiner* — Daniel Previl
(74) *Attorney, Agent, or Firm* — Frank MacKenzie; Brooks Kushman P.C.

(57) ABSTRACT

A vehicle includes a tire rotation reminder system. The system includes a controller that generates a tire rotation reminder based on a predicted driving time for attaining a predetermined difference in tread wear between front tires and rear tires. The predicted driving time is based on a rate of change of a difference between a front tire circumference and a rear tire circumference. The tire rotation reminder is output when the predicted driving time is less than a predetermined time. The tire rotation reminder system may interface with at display to output additional information related to tire rotation. The tire rotation reminder may be communicated using a visual indicator, an audible indicator, and a tactile indicator.

20 Claims, 4 Drawing Sheets

TIRE ROTATION WARNING

TECHNICAL FIELD

This application generally relates to alerting a vehicle operator when tires of a vehicle should be rotated.

BACKGROUND

During vehicle operation, tires of a vehicle wear. Over time, the tread of the tires may become worn to a point that necessitates replacement of the tires. Proper vehicle maintenance may extend the operational life of the tires. Rotation of the tires is one such procedure that may increase the usable life of the tires. Tire rotation involves changing the position of the tires on the vehicle at periodic intervals to vary the wear on the tires. Over time, each tire is changed to a different position to equalize the wear on the tires. It is generally left to the operator to determine when tire rotation is needed. As many operators may neglect to monitor when tire rotation is needed, the tires may be operated for longer intervals without rotation leading to faster wear and earlier replacement.

SUMMARY

A vehicle includes a controller programmed to output a tire rotation reminder in response to a predicted driving time for attaining a predetermined difference in tread wear between front tires and rear tires being less than a predetermined time. The predicted driving time is based on a rate of change of a difference between a front tire circumference and a rear tire circumference. The vehicle may further include a display module configured to display the tire rotation reminder and the predicted driving time, and the controller may be further programmed to output the predicted driving time for display. The controller may be further programmed to receive an operator input and, in response to the operator input, output instructions for tire rotation. The controller may be further programmed to receive an operator input and, in response to the operator input, inhibit outputting the tire rotation reminder for a predetermined inhibit time. The controller may be further programmed to output the tire rotation reminder in response to a speed of the vehicle being less than a predetermined speed. The front tire circumference may be an average circumference of the front tires. The rear tire circumference may be an average circumference of the rear tires. The vehicle may further include one or more of a visual indicator, an audible indicator and a tactile feedback generator configured to indicate the tire rotation reminder to an operator.

A tire rotation reminder system includes a tire rotation indicator, and a controller programmed to activate the indicator in response to a predicted driving time for attaining a predetermined difference in tread wear between front tires and rear tires being less than a predetermined time. The predicted driving time is based on a rate of change of a difference between a front tire circumference and a rear tire circumference. The tire rotation reminder system may further include a display and the controller may be further programmed to output the predicted driving time to the display. The tire rotation indicator may be a visual indicator. The tire rotation indicator may be an audible indicator. The tire rotation indicator may be a tactile indicator. The controller may be further programmed to receive a user input, and in response to the user input, deactivate the indicator for a predetermined deactivation time.

A method for detecting a tire service interval for a vehicle includes displaying a tire rotation reminder in response to a predicted driving time for attaining a predetermined difference in tread wear between front tires and rear tires being less than a predetermined time, wherein the predicted driving time is based on a rate of change of a difference between a front tire circumference and a rear tire circumference. The method may further include displaying the predicted driving time. The method may further include inputting a user input and inhibiting, in response to the user input, display of the tire rotation reminder for a predetermined inhibit time. The method may further include displaying, in response to displaying the tire rotation reminder, instructions for tire rotation. The method may further include displaying, in response to displaying the tire rotation reminder, contact information for a nearest service facility. Displaying the tire rotation reminder may further be in response to a speed of a vehicle being less than a predetermined speed.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
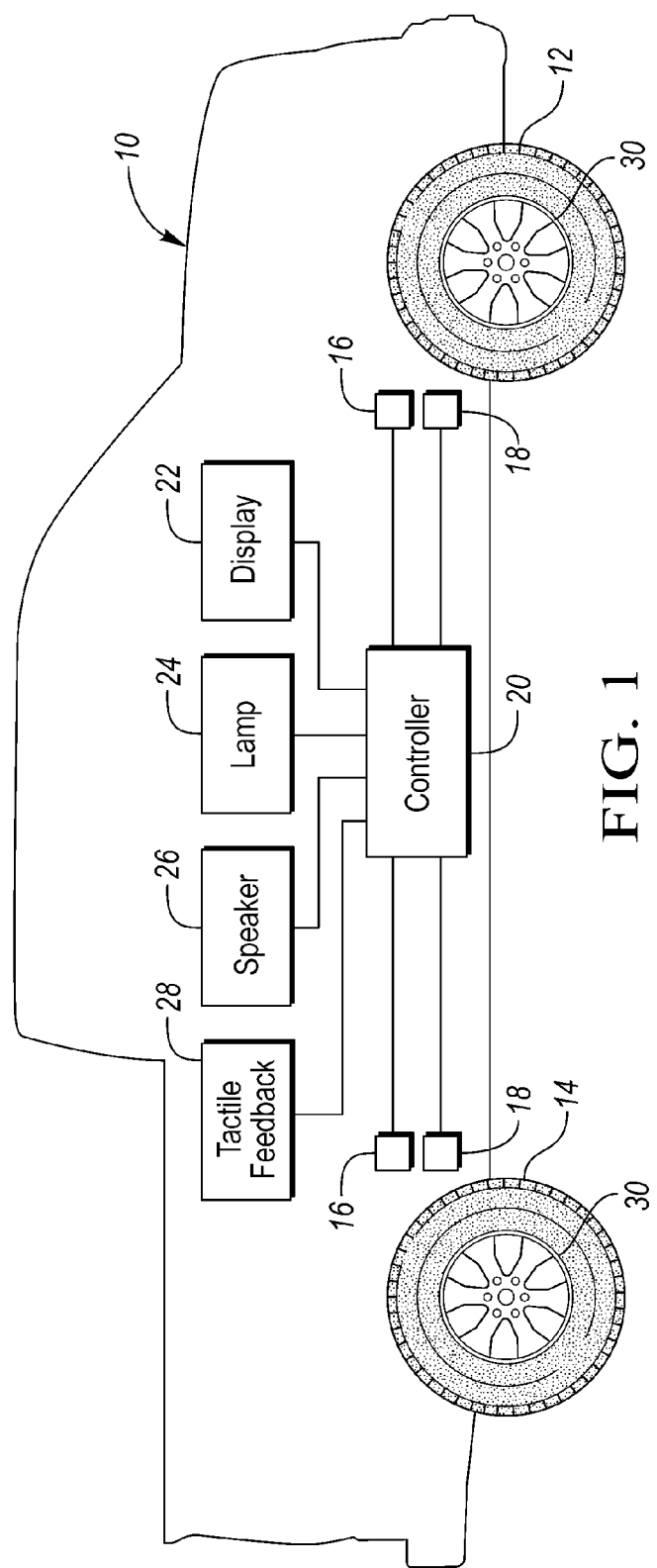
FIG. 1 depicts a possible vehicle configuration including components for a tire rotation reminder.

FIG. 1 depicts a side view of a vehicle 10. The vehicle 10 may include an engine mechanically coupled to a transmission. The transmission may be mechanically coupled to a drive shaft that is mechanically coupled to one or more wheels. Each wheel may include a rim 30 upon which a tire is mounted. The wheels that are coupled to the transmission via the driveshaft may be referred to as driven wheels. The wheels that are independent of the transmission may be referred to as non-driven wheels. The vehicle 10 may be configured as a front-wheel drive vehicle in which the front tires 12 are coupled to the transmission (e.g., front tires 12 are the driven wheels). The vehicle 10 may be configured as a rear-wheel drive vehicle in which the rear tires 14 are coupled to the transmission (e.g., the rear wheels 13 are the driven wheels). The vehicle may be configured as an all-wheel drive vehicle in which all of the wheels, front and rear, may be coupled to the transmission. During operation, engine torque created by combustion of fuel in the engine may be transferred to the driven wheels through the transmission. Torque applied to the driven wheels may cause linear motion of the vehicle 10. An automobile will typically include two front tires 12 and two rear tires 14.

The tires 12, 14 are typically constructed of a rubber material. To improve traction and handling, the tires 12, 14 may have a tread pattern that interfaces with a road surface. The tread pattern may include grooves and channels of a predetermined depth when manufactured. Over time, the rubber material may wear causing the tread pattern to change and the depth to decrease. As the tires 12, 14 wear, traction and handling performance may change. The tires 12, 14 may include a wear indicator to provide an indication that the tires 12, 14 should be replaced. The wear indicator may be visually inspected to determine when the tires 12, 14 should be replaced.

As the vehicle is driven, the tires 12, 14 will wear. The tires 12, 14 may wear at different rates. In some configurations, the front tires 12 may wear at a different rate than the rear tires 14. Factors influencing the wear of the tires 12, 14 include an amount of weight supported by the tires 12, 14 and dynamic operations supported by the tires 12, 14 such as steering, braking, and accelerating. For example, the front tires 12 may be used for steering and may experience increased wear along an outer edge of the tires 12. Driven tires may wear at a faster rate due to slip created between the tire tread and the surface when accelerating the vehicle 10. In some configurations, the front tires 12 may support a greater proportion of the vehicle weight and provide a greater proportion of the braking force which increases the wear rate of the front tires 12 relative to the rear tires 14. In some configurations, the front 12 and rear 14 tires may wear at approximately the same rate. Wear may also be impacted by inflation pressure of the tire.

Tire life may be increased by proper maintenance. Periodic rotation of the tires 12, 14 may extend the life of the tires 12, 14. Rotation of the tires 12, 14 refers to the procedure of periodically moving the tires 12, 14 to a different location. To equalize the wear of the tires 12, 14, it may be beneficial to rotate the tires 12, 14 so that each tire is used periodically on the axle that experiences a faster rate of wear. For example, for some tread configurations, the position of the rear tire 14 and the front tire 12 on one side may be swapped. By rotating the tires 12, 14 periodically, wear of the tires 12, 14 may be equalized. As an example, consider a vehicle having a faster wear rate on the front tires 12. Without periodic rotation service, the front tires 12 may reach an end of tread life before the rear tires 14 resulting in earlier replacement of the front tires 12. Some owners may replace the rear tires 14 at the same time, even though the rear tires 14 may have substantial life remaining.

In order to optimize tire wear, it may be useful for the operator to know when to perform a tire rotation service. Present methods may depend on the operator or vehicle to monitor a distance travelled between tire rotations (e.g., 5,000 miles between tire rotations). These methods generally rely on the operator or vehicle to monitor the distance travelled since the last rotation and perform the rotation at the desired interval. These methods do not consider the actual wear of the tires and, as a result, tires may be rotated sooner or later than is optimal. The ultimate result is that tire life may be reduced due to late maintenance or that maintenance costs may be increased due to unnecessary tire rotations.

The vehicle 10 may include a tire rotation reminder system for monitoring tire wear and determining an appropriate time to perform the tire rotation service. The vehicle 10 may include one or more controllers 20 to implement logic for a system for detecting tire wear and indicating to the operator when the tires should be rotated. Associated with each of the tires 12, 14 may be a wheel speed sensor 16. The wheel speed sensor 16 may output a signal indicative of the speed at which the associated tire 12, 14 is rotating. The vehicle 10 may include a tire pressure monitoring system (TPMS). The TPMS may include a tire pressure sensor 18 associated with each tire 12, 14 to measure an air pressure of the tire. The TPMS may include a controller and circuitry to wirelessly interface with the tire pressure sensors 18. The tire pressure sensors 18 may output a signal indicative of the air pressure with the tire 12, 14. The output of the wheel speed sensors 16 and the tire pressure sensors 18 may be input to the controller 20 for further processing.

Using the wheel speed sensor 16 and tire pressure sensor inputs 18, the controller 20 may determine a tire circumference for each of the tires 12, 14. Such techniques are known or available to those of ordinary skill in the art. In some configurations, an average tire circumference for each of the axles may be computed and utilized is subsequent computations.

The controller 20 may compute a difference between a front tire circumference and a rear tire circumference. In some configurations, the front tire circumference may be an average tire circumference of the front tires 12 and the rear tire circumference may be an average tire circumference of the rear tires 14. The difference may be expressed as:

$$\Delta C(t) = C_f(t) - C_r(t) \tag{1}$$

where $C_f(t)$ is the front-tire circumference and $C_r(t)$ is the rear-tire circumference.

The characteristics of the difference may be such that a positive difference indicates that the front-tire circumference is greater than the rear-tire circumference. In a configuration in which the front tires 12 wear faster than the rear tires 14, the positive difference may be indicative of a recent tire rotation. The difference may be indicative of a relative level of tread wear between the front 12 and rear 14 tires of the vehicle 10.

The controller 20 may compute a rate of change or slope of the difference between the front-tire circumference and the rear-tire circumference. The rate of change may be with respect to time. In some configurations, the rate of change may be with respect to distance travelled. The rate of change of the difference may be indicative as to how the tires on each axle are wearing relative to one another. The rate of change with respect to time may be computed as:

$$\frac{d(\Delta C)}{dt} = \frac{\Delta C(t_2) - \Delta C(t_1)}{t_2 - t_1} \tag{2}$$

where $t_2 > t_1$. In some configurations, the time difference, $t_2 - t_1$, may be an accumulated interval between computations, T. As it may take a relatively long period of time before a tire circumference change is detected, the interval, T, may be a relatively long period of time. The time value, T, may be accumulated over a number of drive cycles. The time value, T, may only incorporate time over which the vehicle is being driven. For example, the time may be accumulated when the vehicle speed is above a minimum threshold indicative of the vehicle being driven. Values of the tire circumferences and associated times may be stored in non-volatile memory for retrieval during subsequent drive cycles.

A predicted future difference may be calculated based on the rate of change as follows:

$$\Delta C(t_f) = \Delta C(t_i) + \frac{d(\Delta C(t_i))}{dt}(t_f - t_i) \quad (3)$$

where $t_i$ is the present time and $t_f$ is a future time. Using equation (3), a future difference may be computed based on a present difference, the rate of change, and the time interval. The final difference may be selected as a predetermined difference, K, that may be a constant based on a maximum tire wear difference between the front 12 and rear 14 tires. The predetermined difference may represent a relative amount of wear at which time a tire rotation should be performed.

Figure 3A:
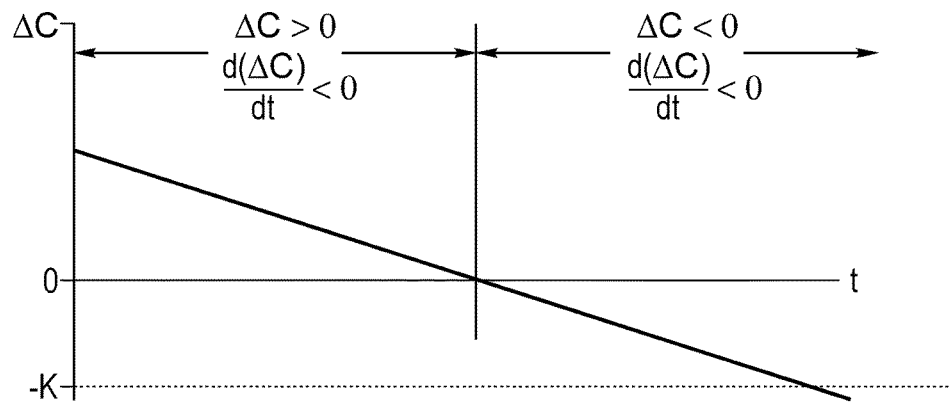
FIG. 3A is a plot of a possible relative change in tire circumference over time for a vehicle in which a rate of change of tire wear is greater for front tires.
Figure 3B:
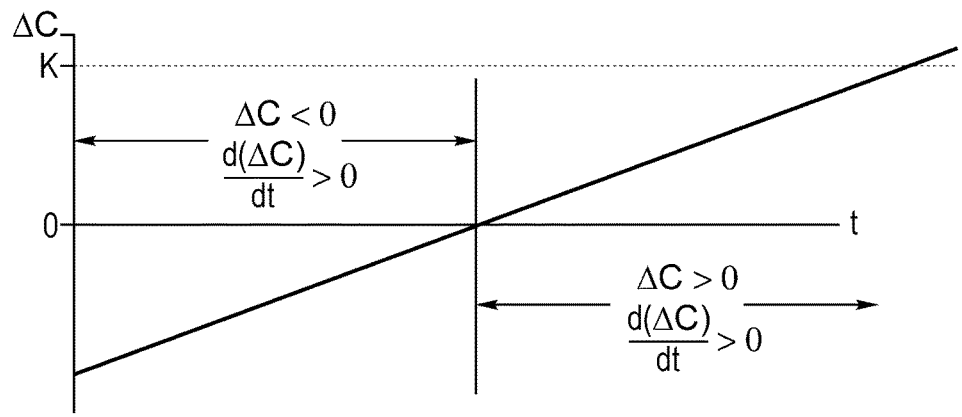
FIG. 3B is a plot of a possible relative change in tire circumference over time for a vehicle in which a rate of change of tire wear is greater for rear tires.

The controller 20 may compute a predicted driving time at which tire rotation maintenance should be performed. The predetermined difference between the front-tire circumference and the rear-tire circumference may be selected. A polarity of the predetermined difference may change based on which tires are expected to wear faster relative to the other. For example, in a configuration in which the front tires wear faster, the predetermined difference, K, may have a negative polarity or sign. FIG. 3A depicts a plot of the difference over time for a configuration in which the front tires 12 wear faster that the rear tires 14. In a configuration in which the rear tires 14 wear faster, the predetermined difference, K, may have a positive polarity or sign. FIG. 3B depicts a plot of the difference over time for a configuration in which the rear tires 14 wear faster than the front tires 14. Replacing the future difference with the predetermined difference, Equation (3) may be expressed as:

$$\Delta C(t) + \frac{d(\Delta C)}{dt} * \Delta T = K \quad (4)$$

Solving for time interval, $\Delta T$, yields:

$$\Delta T = \frac{K - \Delta C(t)}{d(\Delta C)/dt} \quad (5)$$

To account for the various polarities of the difference and its derivative, a more generic formula for the time until rotation may be expressed as:

$$\Delta T = \frac{K sign(d(\Delta C)/dt) - \Delta C(t)}{d(\Delta C)/dt} \quad (6)$$

where sign(X) indicates the polarity or sign (positive or negative) of the input quantity, X. Equation (6) provides the general expression for the predicted driving time until rotation for the different polarity possibilities. The resulting time may be expressed in units of hours, weeks, or months depending on the application. The time may indicate an amount of operating or driving time of the vehicle 10 before a tire rotation should be performed.

Figure 4:
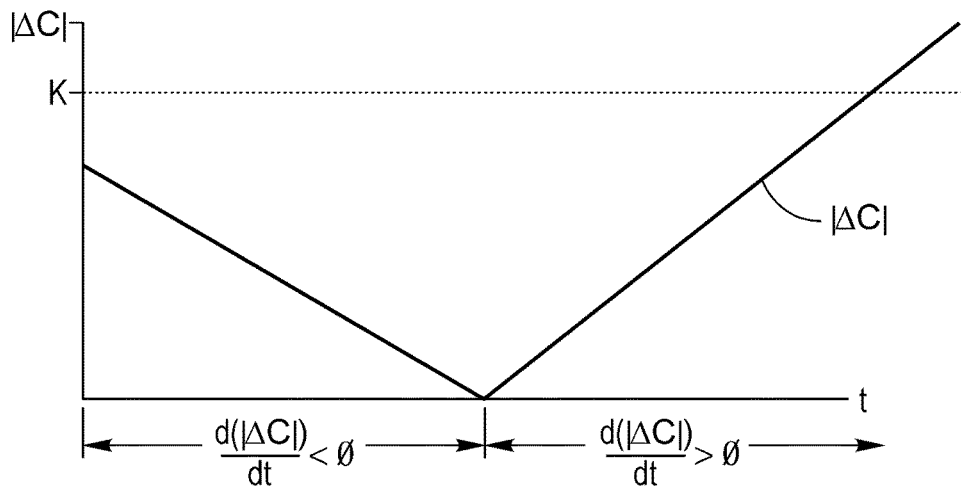
FIG. 4 is a plot of a possible absolute value of a relative change in tire circumference over time.

Alternatively, an absolute value of the difference may be used. FIG. 4 depicts a plot of the absolute value of the difference over time for either of the cases presented in FIG. 3A or FIG. 3B. The rate of change of the absolute value may be computed. The rate of change of the absolute value may be negative when the front-tire circumference and the rear-tire circumference are converging. The rate of change of the absolute value of the difference may be positive when the front-tire circumference and the rear-tire circumference are diverging. In this case, the rate of change of the absolute value may be monitored to detect when the difference is increasing. In this case, the predetermined difference may have a positive polarity or sign. The time until the predetermined difference is given as:

$$\Delta T = \frac{K - |\Delta C(t)|}{d(|\Delta C|)/dt} \quad (7)$$

The formulation of Equation (7) yields the predicted driving time until rotation value only when the derivative term is positive. The controller 20 may monitor the derivative term and compute the time until tire rotation when the derivative has a positive polarity. The formulation of Equation (6) may yield the time until tire rotation for any polarity of the derivative term.

Display of the predicted driving time until rotation may be delayed until a reliable value of the derivative term is determined. The display of the time until rotation may be inhibited until the difference and its derivative are the same sign. This may indicate that one of the tires is wearing faster than the other. When the difference and its derivative have different polarity the tire circumferences may be converging to one another. The display of the time until rotation may be inhibited until the rate of change of the absolute value of the difference is positive indicating that the difference is increasing.

In some configurations, the time until rotation may be converted to a distance until rotation. An average distance over time may be computed. For example, the vehicle 10 may include an odometer that accumulates a distance traveled by the vehicle 10. The odometer may be sampled periodically and a rate of change of distance with respect to time may be calculated. For example, the odometer may be sampled at the beginning of the week and at the end of the week to determine a miles/week estimate. An average miles/week may be calculated based on the last N miles/week values. Assuming the time to rotation is expressed in weeks, a distance to rotation may be calculated as the product of the average miles/week and the time to rotation. The resulting distance may be in units of miles. Note that the same analysis may be applied when distance is expressed in kilometers.

The controller 20 may compute the time until tire rotation periodically during vehicle operation. However, a tire rotation reminder may not be output until the time to rotation is less than a predetermined time threshold. This prevents the tire rotation reminder from being displayed prematurely. For example, the predetermined threshold may be a time period of 24 hours. So that a tire rotation reminder may not be displayed until the time to rotation reminder is less than 24 hours.

In some configurations, the predetermined time threshold may be adjusted based on driving habits of the operator. If an average time of vehicle operation per day is relatively low, the predetermined time threshold may be reduced so that the reminder is not perceived as being too early. For example, it may be desired to issue a reminder when the amount of operating time is equivalent to one week or less. In addition, assume that the vehicle in the example is on average driven for one hour per day. In order to achieve a reminder within one week, the predetermined threshold would be set to seven hours in this example. Assuming the operator maintains these driving habits, the tire rotation reminder may be issued when the time to rotation is less than seven hours.

In a configuration that is based on the distance, the predetermined time threshold may be converted to a distance threshold (e.g., 100 miles). The predetermined time threshold may be selected to provide an adequate warning to the operator so that a tire rotation may be scheduled a reasonable time or distance after detection.

In some configurations, the tire rotation reminder may be displayed when a speed of the vehicle 10 is less than a predetermined speed. For example, the tire rotation reminder may be displayed when the vehicle 10 is at a standstill condition (e.g., zero speed). This condition may prevent operator distraction at higher vehicle speeds. The tire rotation reminder may include an audible, visual, and/or tactile component. The vehicle 10 may include a speaker 26 or buzzer for providing the audible component. The vehicle 10 may include a display screen 22 or lamp 24 for providing the visual component. The vehicle 10 may include a vibrating mechanism 28 for providing the tactile component. For example, the vibrating mechanism 28 may be located in a steering wheel, a seat or seat back, or an accelerator pedal.

In some configurations, the time to rotation value may be output to the display 22. The display module 22 may be configured to display the time to rotation in a predetermined format. The displayed value may be a numeric value. The value may be displayed as a gauge with an indicator. The display may be an hour glass that is filled in as the time to rotation decreases. The value may also be displayed as a color scale. For example, as the time to rotation decreases, the color may progress from green to red.

In some configurations, the display module 22 may display other information to the operator in conjunction with the tire rotation reminder. For example, additional content may be displayed on display screen to ask the operator if further assistance regarding tire rotation is desired. For example, a message may be displayed on the display 22. The display module 22 may request a user input. For example, the display 22 may be a touchscreen that may present one or more virtual buttons for the operator to press. For example, upon pressing a first virtual button, the display module 22 may display instructions for rotating the tires. For example, the rotation pattern may be displayed on the display 22. The rotation pattern may indicate the location to which each tire should be moved. An arrow from a current tire location to a next tire location after rotation may be displayed. Also, contact information for the nearest service facility may be displayed (e.g., nearest dealership).

Upon pressing a second virtual button, the tire rotation reminder may be cleared and the tire rotation reminder logic may be reset. In the event that the tires are not rotated, the tire rotation reminder may be displayed again when the conditions are satisfied. In the event that the tires were not actually rotated, the reminder may be displayed immediately. In some configurations, the resetting of the tire rotation reminder may set a time for inhibiting the return of the tire rotation reminder. For example, the tire rotation reminder may be inhibited for five days after a reset. This may prevent the system from continually alerting the operator. The inhibition time may be selected to balance alerting the driver with minimizing distractions to the driver.

In some configurations, the tire rotation reminder logic may automatically reset. After rotating the tires, it may be expected that the difference between the front and rear tire circumferences may change polarity (e.g., change from negative to positive). The controller 20 may monitor for a polarity change in the difference and this may indicate that the tires have been rotated. When this condition is detected, the circumference values may be updated and stored as initial values.

Figure 2A:
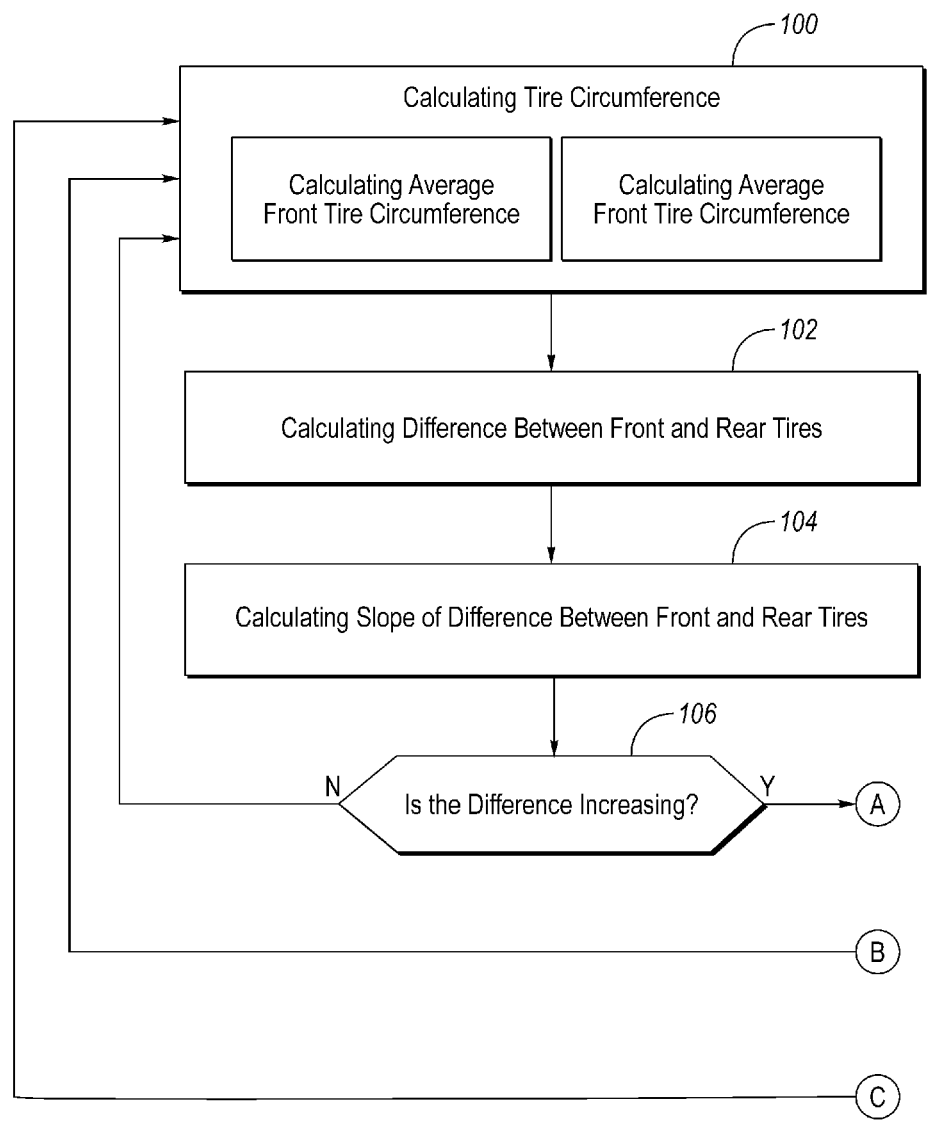
FIGS. 2A and 2B depict a possible block diagram of controller-implemented operations for a tire rotation reminder.
Figure 2B:
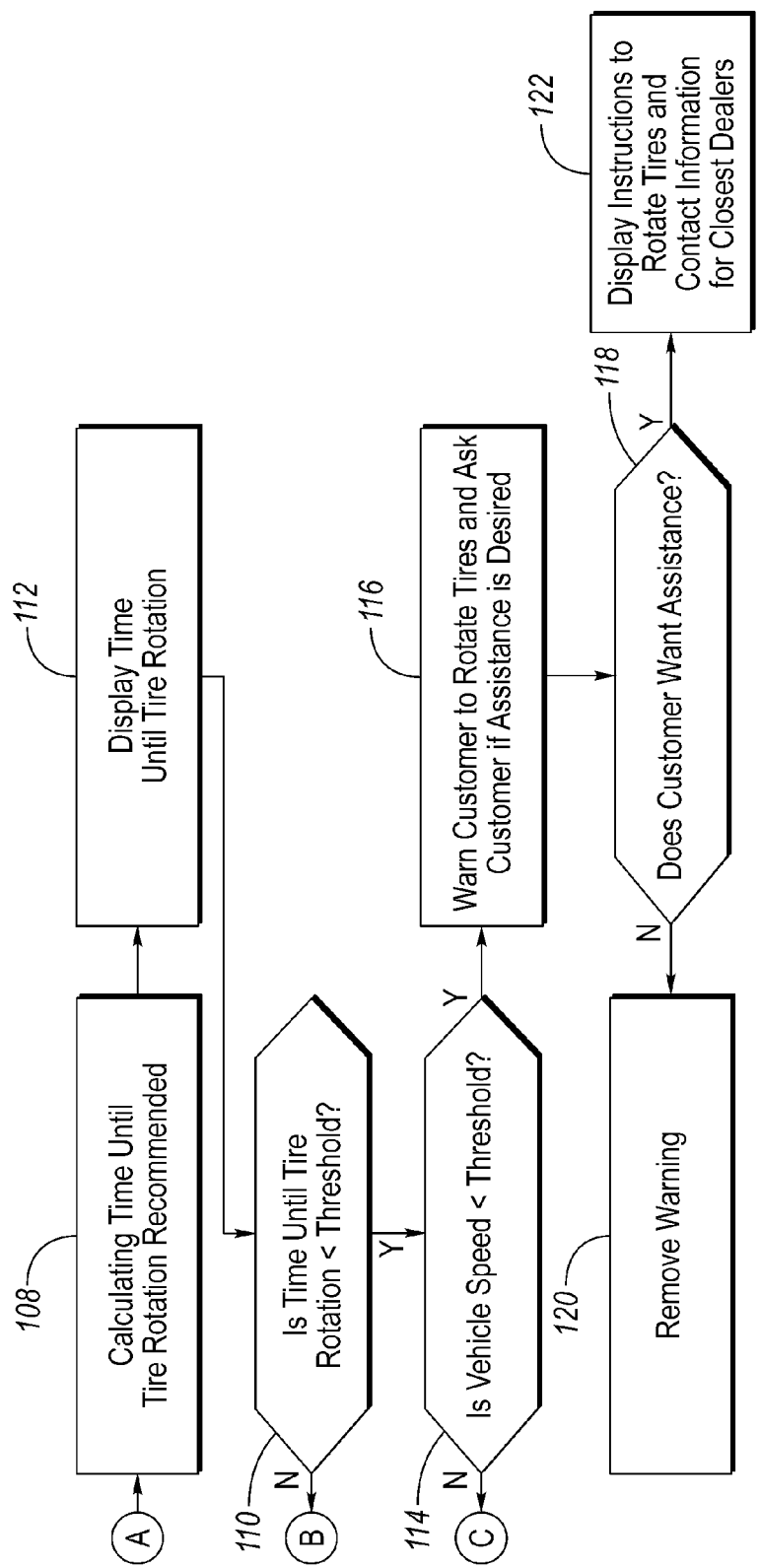

FIG. 2 depicts a possible sequence of operations for implementing the tire rotation reminder in the controller 20. At 100, the tire circumferences are calculated. The tire circumferences may be computed using the wheel speed inputs and tire pressure sensor inputs. An average front tire circumference and an average rear tire circumference may be computed.

At operation 102, the difference between the front tire circumference and the rear tire circumference is computed. An additional operation may include computing the absolute value of the difference. At operation 104, the slope or rate of change of the difference is computed as described earlier.

At decision operation 106, a comparison is performed to determine if the difference is increasing. If the difference is not increasing, execution may return to operation 100 to continue monitoring the tire circumferences. If the difference is increasing, execution may pass to operation 108. At operation 108, the time until tire rotation is recommended is computed by the methods described herein. Operation 112 may be implemented to display the time until tire rotation. At decision block 110, the time until tire rotation may be compared to a time threshold. If the time until rotation is greater than or equal to the time threshold, execution may return to operation 100. If the time until rotation is less than the time threshold, execution may pass to decision block 114.

At 114, the vehicle speed may be compared to a speed threshold. If the vehicle speed is greater than or equal to the speed threshold, execution may return to operation 100. If the vehicle speed is less than the speed threshold, execution may pass to operation 116. At operation 116, a tire rotation reminder may be generated and displayed to the operation. Additional displays may be generated to determine if the operator needs further assistance with tire rotation. For example, the operation may be queried is additional assistance is desired and virtual buttons may be displayed on a touchscreen. Execution may pass to decision block 118 to determine if further assistance is desired. If further assistance is desired (e.g., based on virtual button selected), execution may pass to operation 122. Operation 122 may display tire rotation instructions and contact information for the nearest dealership. If no assistance is desired, execution may pass to operation 120. At operation 120, the tire rotation reminder may be removed or inhibited. The operations may be repeated over subsequent drive cycles.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a controller programmed to output a tire rotation reminder in response to a predicted driving time for attaining a predetermined difference in tread wear between front tires and rear tires being less than a predetermined time, wherein the predicted driving time is based on a rate of change of a difference between a front tire circumference and a rear tire circumference.

2. The vehicle of claim 1 further comprising a display module configured to display the tire rotation reminder and the predicted driving time, and wherein the controller is further programmed to output the predicted driving time for display.

3. The vehicle of claim 1 wherein the controller is further programmed to receive an operator input and, in response to the operator input, output instructions for tire rotation.

4. The vehicle of claim 1 wherein the controller is further programmed to receive an operator input and, in response to the operator input, inhibit outputting the tire rotation reminder for a predetermined inhibit time.

5. The vehicle of claim 1 wherein the controller is further programmed to output the tire rotation reminder in response to a speed of the vehicle being less than a predetermined speed.

6. The vehicle of claim 1 wherein the front tire circumference is an average circumference of the front tires.

7. The vehicle of claim 1 wherein the rear tire circumference is an average circumference of the rear tires.

8. The vehicle of claim 1 further comprising one or more of a visual indicator, an audible indicator and a tactile feedback generator configured to indicate the tire rotation reminder to an operator.

9. A tire rotation reminder system comprising:
a tire rotation indicator; and
a controller programmed to activate the indicator in response to a predicted driving time for attaining a predetermined difference in tread wear between front tires and rear tires being less than a predetermined time, wherein the predicted driving time is based on a rate of change of a difference between a front tire circumference and a rear tire circumference.

10. The tire rotation reminder system of claim 9 further comprising a display, wherein the controller is further programmed to output the predicted driving time to the display.

11. The tire rotation reminder system of claim 9 wherein the tire rotation indicator is a visual indicator.

12. The tire rotation reminder system of claim 9 wherein the tire rotation indicator is an audible indicator.

13. The tire rotation reminder system of claim 9 wherein the tire rotation indicator is a tactile indicator.

14. The tire rotation reminder system of claim 9 wherein the controller is further programmed to receive a user input, and in response to the user input, deactivate the indicator for a predetermined deactivation time.

15. A method for detecting a tire service interval for a vehicle comprising:
displaying a tire rotation reminder in response to a predicted driving time for attaining a predetermined difference in tread wear between front tires and rear tires being less than a predetermined time, wherein the predicted driving time is based on a rate of change of a difference between a front tire circumference and a rear tire circumference.

16. The method of claim 15 further comprising displaying the predicted driving time.

17. The method of claim 15 further comprising inputting a user input and inhibiting, in response to the user input, display of the tire rotation reminder for a predetermined inhibit time.

18. The method of claim 15 further comprising displaying, in response to displaying the tire rotation reminder, instructions for tire rotation.

19. The method of claim 15 further comprising displaying, in response to displaying the tire rotation reminder, contact information for a nearest service facility.

20. The method of claim 15 wherein displaying the tire rotation reminder is further in response to a speed of a vehicle being less than a predetermined speed.

* * * * *